(12) United States Patent
Higgins

(10) Patent No.: US 11,754,056 B1
(45) Date of Patent: Sep. 12, 2023

(54) DYNAMIC MASS TORQUE GENERATOR

(71) Applicant: Matthew Higgins, Albuquerque, NM (US)

(72) Inventor: Matthew Higgins, Albuquerque, NM (US)

(73) Assignee: Hawk Spider Energy Corp., Albuquerque, NM (US)

( * ) Notice: Subject to any disclaimer, the term of this patent is extended or adjusted under 35 U.S.C. 154(b) by 58 days.

(21) Appl. No.: 17/706,344

(22) Filed: Mar. 28, 2022

Related U.S. Application Data

(60) Provisional application No. 63/166,457, filed on Mar. 26, 2021.

(51) Int. Cl.
*F03G 3/00* (2006.01)
*F03G 3/08* (2006.01)
(Continued)

(52) U.S. Cl.
CPC .............. *F03G 3/08* (2013.01); *F03G 1/026* (2021.08); *F03G 7/107* (2021.08)

(58) Field of Classification Search
CPC ... F03G 1/026; F03G 1/08; F03G 3/08; F03G 3/087; F03G 3/094; F03G 7/10; F03G 7/107; F03B 17/025; F03B 17/04
See application file for complete search history.

(56) References Cited

U.S. PATENT DOCUMENTS 5,133,637 A 7/1992 Wadsworth
6,841,894 B2 1/2005 Gomar
(Continued)

FOREIGN PATENT DOCUMENTS

AU 2008256003 B2 5/2011
AU 2020200853 B2 2/2020
(Continued)

*Primary Examiner* — Phillip A Johnson
(74) *Attorney, Agent, or Firm* — Kameron W. Kramer

(57) ABSTRACT

A dynamic mass torque generator for producing renewable energy, the dynamic mass torque generator comprising a dynamic mass assembly, wherein the dynamic mass assembly comprises a ballast tank disposed on ballast tank support arms with distal ends of the ballast tank support arms hingeably attached to a glide car via ballast tank support arm hinges and a counter-weight ballast tank disposed on counter-weight ballast tank support arms with distal ends of the counter-weight ballast tank support arms hingeably attached to the glide car via counter-weight ballast tank support arm hinges, wherein the dynamic mass assembly transfers fluid between the ballast tank and the counter-weight ballast tank using a ballast pump to generate torque; and a torsion spring assembly coupled to the dynamic mass assembly, wherein the torsion spring assembly comprises an angle bevel gear-drive coupled to a torsion-spring axel and a crankshaft gear-drive intercept, using a torsion-spring shaft coupling, wherein the angle bevel gear-drive receives the generated torque by transferring lateral rotation to the crankshaft gear-drive intercept using a torsion-spring axel, which further diverts the torque to a clutch crankshaft gear for rotating a clutch crankshaft coupled to the clutch crankshaft gear and a torsion spring configured to store the torque, maintained by the crankshaft gear-drive intercept, as potential energy using a flywheel clutch, wherein the clutch crankshaft gear rotates, a crankshaft-connector-to-clutch-release directs a torsion spring rotational clutch away from the torsion spring, and thereby releasing the stored potential energy through a flywheel which rotates a turbine generator to produce electricity.

15 Claims, 5 Drawing Sheets

(51) Int. Cl.
    *F03G 7/10*     (2006.01)
    *F03G 1/02*     (2006.01)

(56) References Cited

U.S. PATENT DOCUMENTS

| | | | |
|---|---|---|---|
| 6,843,776 | B2 | 1/2005 | Trandafir et al. |
| 6,984,899 | B1 | 1/2006 | Rice |
| 7,352,076 | B1 | 4/2008 | Gabrys |
| 7,432,686 | B2 | 10/2008 | Erdman et al. |
| 7,470,086 | B2 | 12/2008 | Jennings et al. |
| 7,642,741 | B2 | 1/2010 | Sidman |
| 7,736,125 | B2 | 6/2010 | Bagepalli et al. |
| 8,179,078 | B2 | 5/2012 | Sidman |
| 8,198,742 | B2 | 6/2012 | Holm et al. |
| 8,328,514 | B2 | 12/2012 | Viripullan et al. |
| 8,362,633 | B2 | 1/2013 | Kazuhisa et al. |
| 8,373,297 | B2 | 2/2013 | Grigg |
| 8,426,992 | B2 | 4/2013 | Baarman et al. |
| 8,426,995 | B2 | 4/2013 | Langel |
| 8,464,990 | B2 | 6/2013 | Flores |
| 8,823,195 | B2 | 9/2014 | Legacy |
| 8,946,922 | B1 | 2/2015 | Johnson |
| 9,062,655 | B2 | 6/2015 | Scott |
| 9,341,163 | B2 | 5/2016 | Wakasa et al. |
| 9,450,416 | B2 | 9/2016 | Ma et al. |
| 10,027,266 | B2 | 7/2018 | Beekman et al. |
| 2003/0059292 | A1 | 3/2003 | Baker |
| 2004/0094964 | A1 | 5/2004 | Mikhail et al. |
| 2011/0309630 | A1 | 12/2011 | Kimiabeigi et al. |
| 2017/0051724 | A1 | 2/2017 | Dagher et al. |
| 2021/0044177 | A1 * | 2/2021 | Alghamedi ............... F03G 3/08 |

FOREIGN PATENT DOCUMENTS

| | | | | |
|---|---|---|---|---|
| CA | 2531278 | C | 7/2009 | |
| CA | 2644019 | C | 7/2011 | |
| CN | 101039090 | B | 1/2005 | |
| CN | 1268843 | C | 8/2006 | |
| CN | 201218166 | Y | 4/2009 | |
| CN | 1926742 | B | 5/2011 | |
| CN | 202718802 | U | 2/2013 | |
| CN | 202974425 | U | 6/2013 | |
| CN | 102472249 | B | 7/2014 | |
| CN | 103441524 | B | 2/2015 | |
| CN | 104373281 | A | 2/2015 | |
| CN | 104533693 | A | 4/2015 | |
| CN | 107143457 | A | 9/2017 | |
| EP | 2633596 | A1 | 6/2014 | |
| EP | 2913524 | A1 * | 9/2015 | ............... F03G 7/10 |
| EP | 1590567 | B | 10/2017 | |
| EP | 2060786 | B1 | 2/2018 | |
| ES | 2734393 | T3 | 12/2019 | |
| JP | 3141948 | U | 5/2008 | |
| JP | 5101689 | B2 | 12/2012 | |
| JP | 5134738 | B2 | 1/2013 | |
| JP | 5200097 | B2 | 5/2013 | |
| KR | 20020072745 | A | 9/2002 | |
| KR | 101027055 | B1 | 4/2011 | |
| TW | M527918 | U | 9/2016 | |
| WO | 2012039693 | A1 | 3/2012 | |
| WO | WO-2021116154 | A1 * | 6/2021 | ............... F03G 3/08 |

\* cited by examiner

DYNAMIC MASS TORQUE GENERATOR

CROSS-REFERENCE TO RELATED APPLICATION

This application claims the benefit of U.S. Provisional Patent Application Ser. No. 63/166,457 filed Mar. 26, 2021, titled "A Platform Holding Mass For Producing Energy," and the subject matter thereof is incorporated herein by reference thereto.

TECHNICAL FIELD

The present invention relates to energy creation, and more specifically to an apparatus that creates renewable energy.

BACKGROUND ART

The need for energy in the world will only increase in the coming years. Historically, non-renewable energies such as oil and coal have been utilized. There has been a push throughout the years to move away from these types of energies for a variety of reasons. Non-renewable energies are, as their name suggests, are fossil fuels that cannot be renewed. Additionally, many harmful byproducts are produced and released during the manufacture and use of these non-renewable energies. Renewable energies such as solar and wind have their downsides, including, cost, danger, reliability, scalability, and maintenance, just to name a few.

Many of the renewable energy sources require seasonal or time of day reactions from either sunlight, wind, or waves. This creates an intermittent power source that can be unreliable in many parts of the world, or requires a large, and permanent infrastructure that is invasive in dense urban environments.

Existing apparatuses contained in the prior art present often need tremendous and permanent infrastructure for both structural and spatial conditions that make their placement and geographic location somewhat limited. Other renewable energy systems are geographically specific (coastal vs. plains) and do not generate equally efficient power production in all areas of the world.

The need for clean renewable energy without the use of sun, wind, water pressure, ocean waves, fusion, combustion, or other elements is not currently available at a human-scale.

The present invention overcomes the shortcomings contained in the prior art by providing clean renewable energy using opposing ballast tanks and resultant torque, without the use of natural resources, weather, fusion, or combustion. The present invention can be implemented in any location without access to the outdoor ambient air, sun, water, or extreme heights like required with gravity turbine generators. The present invention can be easily transported requiring less permanent infrastructure and installed in places where other energy sources are not appropriate. None of the prior art fully addresses the problems resolved by the present invention.

The present invention provides a self-contained structure and does not require significant infrastructure prior to installation. Due to the independence from climate specific weather patterns or resource availability this invention can produce the same efficiency of power production in nearly any location in the world.

Certain embodiments of the invention have other steps or elements in addition to or in place of those mentioned above. The steps or element will become apparent to those skilled in the art from a reading of the following detailed description when taken with reference to the accompanying figures.

DETAILED DESCRIPTION OF THE INVENTION

Figure 1:
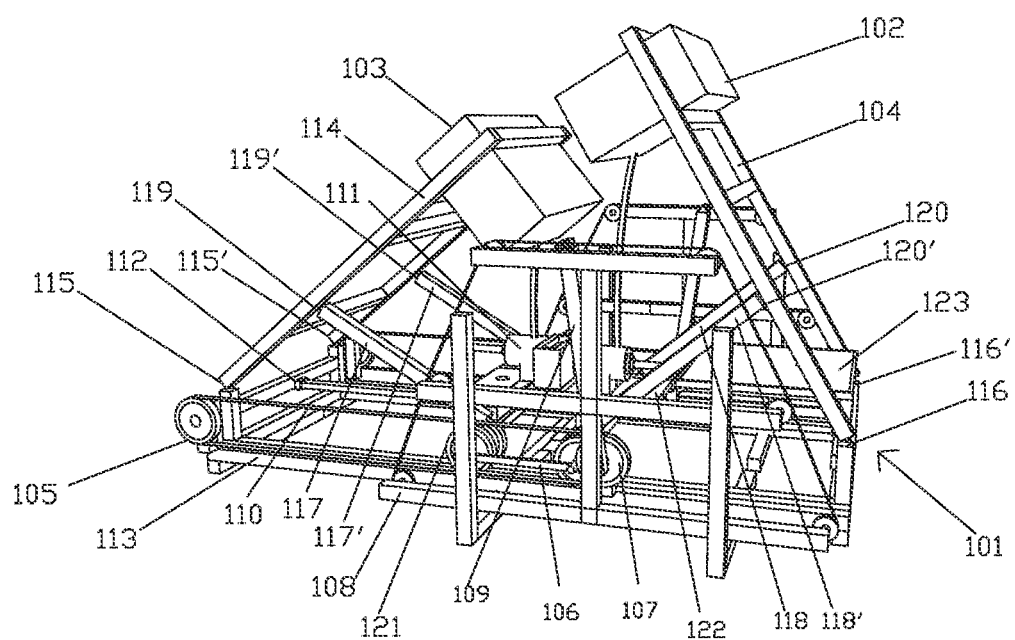
FIG. 1 illustrates a perspective view of the dynamic mass assembly of the present invention.

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail. The figures illustrating embodiments of the system are semi-diagrammatic and not to scale and, particularly, some of the dimensions are for the clarity of presentation and are shown exaggerated in the drawing figures.

Alternate embodiments have been included throughout, and the order of such are not intended to have any other significance or provide limitations for the present invention.

For expository purposes, the term "horizontal" as used herein is defined as a plane parallel to the plane or surface of the present apparatus, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures. The term "on" means that there is direct contact among elements.

The present invention provides an apparatus that creates clean renewable energy using opposing ballast tanks and resultant torque, without the use of natural resources, weather, fusion, or combustion.

FIG. 1 illustrates a perspective view of dynamic mass assembly 101. Dynamic mass assembly 101 transfers fluid between ballast tank 102 and counter-weight ballast tank 103 using ballast pump 111.

Ballast tank 102 is disposed on ballast tank support arms 104. The distal ends of ballast tank support arms 104 are hingeably attached to glide-track 113 via ballast tank support arm hinges 116 and 116'. Ballast tank glide car arms 118 and 118' are hingeably attached to ballast tank support arms 104 at some point near between the ends of ballast tank support arms 104. The distal ends of ballast tank glide car arms 118 and 118' are hingeably attached to glide car 122 (hinges are not seen in this figure). Glide-track 113 is disposed on the base of dynamic mass assembly 101.

Counter-weight ballast tank 103 is disposed on counter-weight ballast tank support arms 114. The distal ends of counter-weight ballast tank support arms 114 are hingeably attached to glide-track 113 via counter-weight ballast tank support arm hinges 115, 115'. Counter-weight ballast tank glide car arm 117 and 117' are hingeably attached to counter-weight ballast tank support arms 114 at some point between the ends of counter-weight ballast tank support arms 114. The distal ends of counter-weight ballast tank glide car arm 117 and 117' are hingeably attached to glide car 122 (hinges are not seen in this figure). Glide car 122 is disposed on glide car wheels 121 that allow glide car 122 to travel on glide-track 113. Multiple sets of glide car wheels 121 are present in the invention, but only one set can be seen on FIG. 1. Angle bevel gear platform 123 is supported by vertical legs attached to glide-track 113.

Ballast tank 102 begins a cycle such that when ballast tank 102 is full and opposing counter-balance tank 103 is empty, hydraulic brake cylinder 112 begins to retract from a full extended position and ballast tank 102 descends. As ballast tank 102 descends, glide-track gear 105 rotates via motion of glide-track chain 110 parallel to glide-track 113, as the ballast tank support arms 104 fold downward with ballast tank 102. Upon movement of glide track gear(s) 105 via glide-track chain 110 the lever-arm gear 107 also rotates via force from ballast tank support arms 104 folding—pushing with glide car 122 to lever-arm gear connector 106, thus rotating lever-arm 109. Upon rotation of lever-arm 109, lever-arm gear-drive 108 transfers low revolutions per minute (RPM) torque and converts to higher RPM torque. Upon full descension of ballast tank 102, ballast pump 111 pumps fluid from to the empty and now suspended counter-balance ballast tank 103, thus reversing the process of rotating lever-arm 109 back to its initial position while empty ballast tank 102 ascends to its original position. Lever-arm gear drive 108 comprises multiple equally spaced gears rotating in the pattern following the arc of lever arm 109. The equally spaced gears are connected to a chain which is driven by an attachment at the end of lever arm 109.

Figure 2:
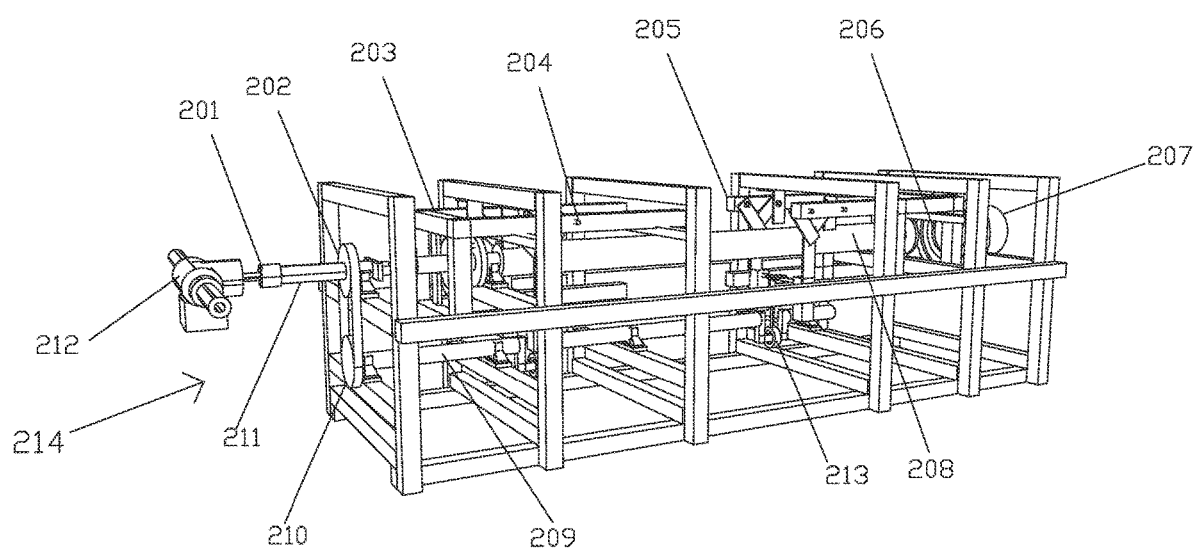
FIG. 2 illustrates a perspective view of the torsion spring assembly of the present invention.

FIG. 2 illustrates a perspective view of torsion spring assembly 214. The torsion spring assembly 214 accepts torque through angle bevel gear-drive 212, transferring lateral rotation 90-degrees and through torsion-spring axel 211. Torsion-spring shaft coupling 201 connects angle bevel gear-drive 212 to both torsion-spring axel 211 and crankshaft gear-drive intercept 202. Rotation of the crankshaft gear-drive intercept 202 diverts torque to the clutch crankshaft gear 210, which rotates the clutch crankshaft 209. torque maintained through crankshaft gear-drive intercept 202 is stored as potential energy in torsion-spring 208 by flywheel clutch 205.

Once clutch crankshaft gear 210 makes a full revolution, crankshaft connector to clutch release 213 is lowered proportionately with the diameter of clutch crankshaft 209 causing coil spring clutch 309 to move away from torsion-spring 208, releasing potential energy through flywheel 206 and consequently rotating high RPM torque through turbine generator 210, producing electricity. Flywheel 206 is able to rotate freely as the rotation of clutch crankshaft 209 simultaneously directs flywheel clutch 205 away from flywheel 206 with the lowering crankshaft connector to clutch release 213.

Figure 3:
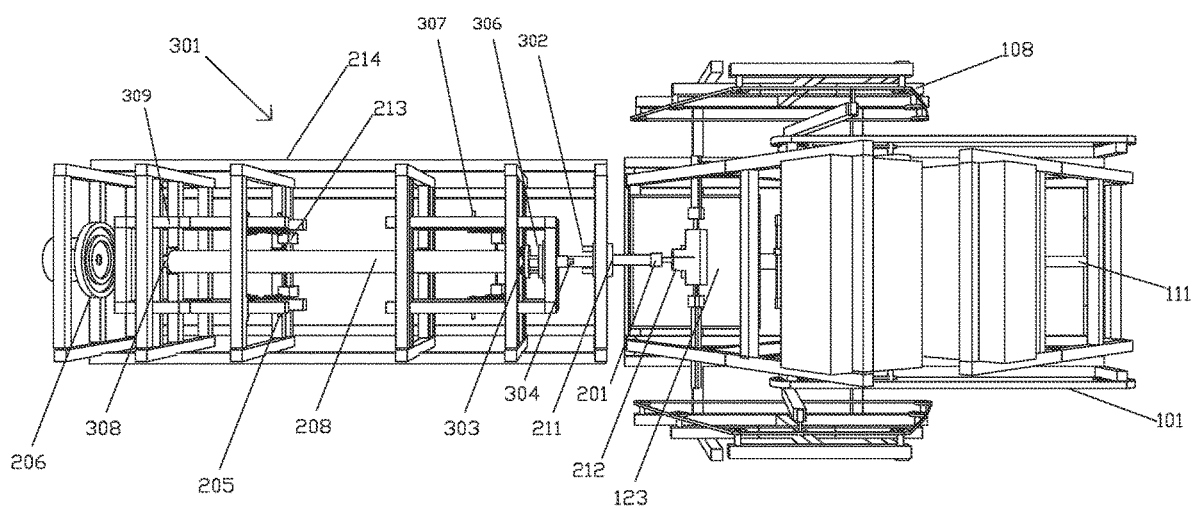
FIG. 3 illustrates a top down view of the dynamic mass assembly and the torsion spring assembly of the present invention connected.

FIG. 3 illustrates a top down view of dynamic mass assembly 101 and torsion spring assembly 214 connected. Dynamic mass torque generator 301 is comprised of torsion spring assembly 214 and the dynamic mass assembly 101.

Torque generated by dynamic mass assembly 101 through lever-arm gear-drive 108 is transferred to angle bevel gear-drive 212 which is mounted on angle bevel gear platform 123. Torque is transferred 90-degrees through angle bevel gear drive 212 from the dynamic mass assembly 101 to the torsion spring assembly 214. Torsion spring 208 is suspended in place on one end via the flywheel clutch pillow block 308 and torque pillow block assembly 303, all of which is aligned with flywheel 206.

Crankshaft connector to clutch release 213 lowers upon rotation of torsion-spring axel 211, releasing flywheel clutch release 205 and coil spring clutch release 307. Upon lowering crankshaft connector to clutch release 213 the flywheel clutch release 205 recedes along the torsion-spring axel 211 away from the flywheel 206 releasing rotational potential energy on the flywheel 206.

Simultaneous to the receding of flywheel clutch release 205, upon lowering of torsion-spring axel 211 coil spring clutch 306 also recedes along torsion-spring axel 211, away from angle bevel gear-drive 212. The receding of coil spring clutch 306 decouples coil spring crank 304 from angle bevel gear crank 302, thus allowing torsion-spring 208 to spin freely around torsion-spring axel 211, release all potential energy.

Coil spring crank 304 when interlocked with angle bevel gear crank 302 rotates half of the torsion-spring 208 (side closest to torsion-spring shaft coupling 201) via torsion-spring axel 211. The other half of torsion-spring 208 remains fixed via flywheel clutch 309. Both flywheel clutch 309 and coil spring clutch 306 move laterally along torsion-spring axel 211 while incorporating a vertical and sealed circular-motion ball-bearing track to allow rotation while moving to engage flywheel 206 and angle bevel gear crank 302. Upon full extension of hydraulic brake cylinder 112, lever-arm gear-drive 108 reaches the end of its motion, also stopping the process of delivering potential energy to flywheel 206.

Figure 4:
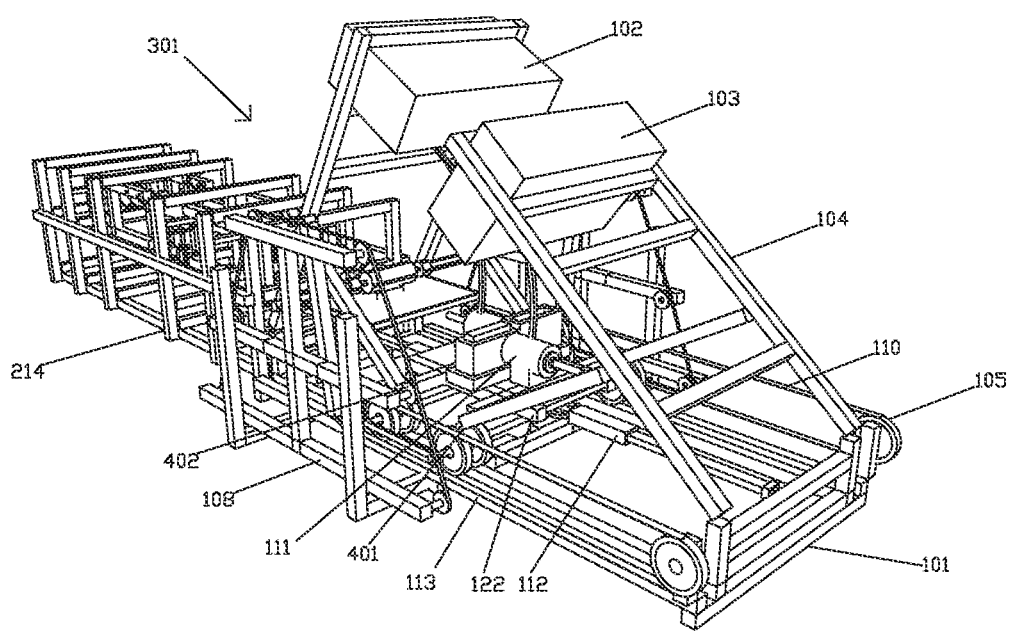
FIG. 4 illustrates a perspective view of the dynamic mass assembly and the torsion spring assembly of the present invention connected.

FIG. 4 illustrates a perspective view of dynamic mass assembly 101 and torsion spring assembly 214 connected, thus combining to form dynamic mass torque generator 301. The dynamic mass torque generator 301 derives torque by interchangeably raising and lowering ballast tank 102 and counter-weight ballast tank 103 by means of glide car 122 traveling parallel to lever-arm gear-drive 108, using glide car wheels 121 resting upon glide-track 113 and interlocked with glide-track chain 110 wound around glide-track gears 105. As counter-weight ballast tank 103 lowers, ballast tank support arms 104 also lower and push glide car 122 toward torsion-spring assembly 214. As counter-weight ballast tank 103 descends, ballast tank 102 ascends with the approach of glide car 122 toward torsion-spring assembly 214. Upon stoppage of travel of glide car 122, when reaching glide-track gear 105 (mounted on all four corners of dynamic mass assembly 101), hydraulic brake cylinder 112 is fully extended locking the dynamic mass assembly 101 in place. Once locked in place ballast pump 111 pumps fluid out of counter-weight ballast tank 103 into empty ballast tank 102. At the completion of filling ballast tank 102 and emptying counter-weight ballast tank 103, hydraulic brake cylinder 112 is released to allow ballast tank 102 to descend, pushing glide car 122 back toward its original position.

The distal ends of ballast tank glide car arms 118 and 118' are hingeably attached to glide car 122 via ballast tank glide car arm distal hinges 402. The distal ends of counter-weight ballast tank glide car arm 117 and 117' are hingeably attached to glide car 122 via counter-weight ballast tank glide car arm distal hinges 401. There are corresponding hinges on both distal ends of counter-weight ballast tank glide car arm 117 and 117' and ballast tank glide car arms 118 and 118', but only counter-weight ballast tank glide car arm distal hinges 401 and ballast tank glide car arm distal hinges 402 are visible in this figure.

Figure 5:
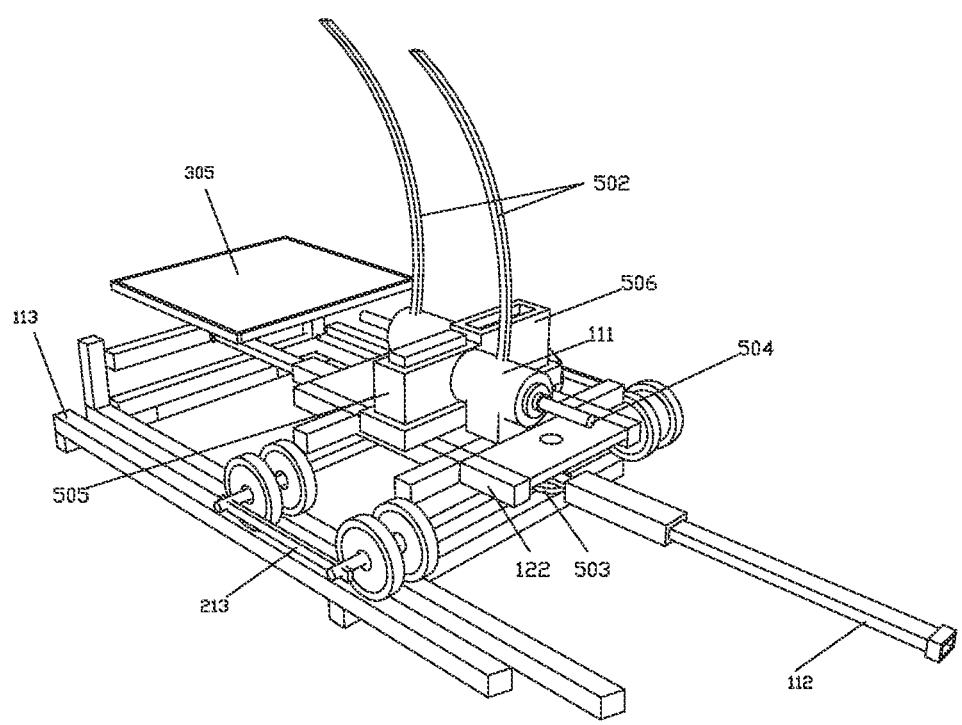
FIG. 5 illustrates a perspective view of the glide car of the present invention.

FIG. 5 illustrates a perspective view of glide car 122. This figure shows glide car 122 without various parts of dynamic mass assembly 101 shown for clarity purposes in order to show other parts that are disposed on glide car 122. Glide car 122 is disposed in dynamic mass assembly 101 as shown in FIGS. 1, 2-4.

Glide car 122 moves along glide-track 113 in a range of motion no longer than hydraulic brake cylinder 112 and the structure supporting angle bevel gear platform 123, and the end of glide-track 113 (in the opposite direction of angle bevel gear platform 123). Mounted upon glide car 122 is pump battery 505 which stores power to energize ballast pumps 111, in order to pump fluid through ballast fluid supply tubing 502 and back through ballast fluid return tubing port 504. hydraulic reservoir 506 is also mounted atop glide car 122, holding fluid for hydraulic brake cylinder 112, from which hydraulic fluid is passed in and out of hydraulic brake cylinder 112 via hydraulic brake cylinder tubing 503 below glide car 122. Glide car to lever-arm gear connector 106 connects glide car wheels 121 of glide car 122 to transfer movement of the overall invention.

A fluid mass is moved between two ballast tanks (ballast tank 102 and counter-weight ballast tank 103) via a low energy pump (ballast pump 111) mounted below ballast tanks (ballast tank 102 and counter-weight ballast tank 103), keeping one ballast tank full (with higher mass) and one ballast tank empty, and leaves the mass in a resting place until the ballast tank support arms 104 have descended to a resting position. The motion from the ballast tank support arm 104 travelling from the starting position to the resting position creates rotational force and associated rotational spin on turbine generator 210. Once the ballast tank support arms 104 have descended the fluid mass is pumped to the empty opposing ballast tank 102 and the counterweight ballast tank 103 causes the ballast tank support arm 104 with ballast tank 102 to move back to its original position. The descension and ascension of the ballast tank support arm 104 generates clean renewable energy without access to elements and in any location, including indoors or underground. Users need to ensure maintenance of ballast pumps 111 to confirm continual pump-operation and energy generation.

A method of generating renewable energy with the current invention, the method comprising generating torque using a lever-arm gear drive 108 by transferring fluid between ballast tank 102 and opposing counter-balance tank 103 using a ballast pump 111. The generated torque is transferred to the angle bevel gear drive 212 that is coupled to a torsion-spring axel 211 and a crankshaft gear-drive intercept 202, using a torsion-spring shaft coupling 201. The lateral rotation of the angle bevel gear-drive 212 is transferred to the crankshaft gear-drive intercept 202 using a torsion-spring axel 211. The torque is diverted to a clutch crankshaft gear 210 to rotating a clutch crankshaft 209 coupled to the clutch crankshaft gear 210. This in turn converts the torque maintained by the crankshaft gear-drive intercept 202 into potential energy and stores the potential energy inside a torsion spring 208 using a flywheel clutch 205. The torsion spring rotational clutch is directed away from the torsion spring 208 when the clutch crankshaft gear 210 rotates, using a crankshaft connector to clutch release 213, rotating a turbine generator 210 by releasing the stored potential energy through a flywheel 206 to produce electricity.

Ballast tank 102 begins a cycle when the ballast tank 102 is full and opposing counter-balance tank 103 is empty and a hydraulic brake cylinder 112 begins to retract from a full extended position and the ballast tank 102 descends. When opposing Ballast tank 102 descends, glide-track gear 105 rotates via motion of glide-track chain 110 parallel to glide-track 113, as the ballast tank support arms 104 fold downward with ballast tank 102.

In an alternate embodiment of the present invention, additional torsion spring assemblies 214 are added to both sides and above the existing torsion spring assembly 214, such that multiple torsion springs 208 is torqued simultaneously, discharging potential energy through individually paired turbine generators 207. Upon adding additional torsion spring assemblies 214, ballast tank 202 and counter-weight ballast tank 203 volumes are increased exponentially to derive additional torque.

In an alternate embodiment of the present invention, any number of ballast tanks are disposed ballast tank support arms.

The best mode for carrying out the invention has been described herein. The previous embodiments are described in sufficient detail to enable those skilled in the art to make and use the invention. It is to be understood that other embodiments would be evident based on the present disclosure, and that system, process, or mechanical changes may be made without departing from the scope of the present invention.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying drawings are to be interpreted in an illustrative and non-limiting sense.

What is claimed is:

1. A dynamic mass torque generator for producing renewable energy, the dynamic mass torque generator comprising:
   a dynamic mass assembly, wherein the dynamic mass assembly comprises:
   a ballast tank disposed on ballast tank support arms with distal ends of the ballast tank support arms hingeably attached to a glide car via ballast tank support arm hinges; and
   a counter-weight ballast tank disposed on counter-weight ballast tank support arms with distal ends of the counter-weight ballast tank support arms hingeably attached to the glide car via counter-weight ballast tank support arm hinges, wherein the dynamic mass assembly transfers fluid between the ballast tank and the counter-weight ballast tank using a ballast pump to generate torque; and
   a torsion spring assembly coupled to the dynamic mass assembly, wherein the torsion spring assembly comprises:
   an angle bevel gear-drive coupled to a torsion-spring axle and a crankshaft gear-drive intercept, using a torsion-spring shaft coupling, wherein the angle bevel gear-drive receives the generated torque by transferring lateral rotation to the crankshaft gear-drive intercept using a torsion-spring axle, which further diverts the torque to a clutch crankshaft gear for rotating a clutch crankshaft coupled to the clutch crankshaft gear; and a torsion spring configured to store the torque, maintained by the crankshaft gear-drive intercept, as potential energy using a flywheel clutch, wherein when the clutch crankshaft gear rotates, a crankshaft connector to clutch release directs a torsion spring rotational clutch away from the torsion spring, and thereby releasing the stored potential energy through a flywheel which rotates a turbine generator to produce electricity.

2. The dynamic mass torque generator of claim 1, wherein the glide car is disposed on glide car wheels that allow the glide car to travel on a glide-track.

3. The dynamic mass torque generator of claim 1, wherein the dynamic mass assembly through a lever-arm gear-drive transfers the generated torque to the angle bevel gear-drive which is mounted on an angle bevel gear platform.

4. The dynamic mass torque generator of claim 1, wherein the dynamic mass torque generator derives torque by interchangeably raising and lowering the ballast tank and the counter-weight ballast tank by means of the glide car traveling parallel to a lever-arm gear-drive, using the glide car wheels resting upon the glide-track and interlocked with a glide-track chain wound around glide-track gears.

5. The dynamic mass torque generator of claim 1, wherein the torsion spring is suspended in place from on one end via the flywheel clutch pillow block and torque pillow block assembly, aligned with the flywheel.

6. The dynamic mass torque generator of claim 1, further comprising a coil spring crank detachably coupled to an angle bevel gear crank, wherein the coil spring crank rotates a first half of the torsion-spring via the torsion-spring axle, and a second half of the torsion spring is fixed via the flywheel clutch.

7. The dynamic mass torque generator of claim 1, wherein the flywheel clutch and the coil spring clutch move laterally along the torsion-spring axel by incorporating a vertical and sealed circular-motion ball-bearing track to allow rotation while moving to engage the flywheel and an angle bevel gear crank.

8. The dynamic mass torque generator of claim 1, wherein the glide car comprises a pump battery to energize the ballast pump, for delivering fluid through a ballast fluid supply tubing and back through a ballast fluid return tubing port.

9. The dynamic mass torque generator of claim 1, wherein the glide car further comprises a hydraulic reservoir for holding fluid for a hydraulic brake cylinder, from which hydraulic fluid is passed in and out of the hydraulic brake cylinder via the hydraulic brake cylinder tubing below the glide car.

10. The dynamic mass torque generator of claim 9, wherein the hydraulic brake cylinder at full extension, facilitates the lever-arm gear-drive to reach end of motion, and stops delivering potential energy to the flywheel.

11. The dynamic mass torque generator of claim 1, wherein the ballast tank begins a cycle when the ballast tank is full and a counter-balance tank is empty and a hydraulic brake cylinder begins to retract from a full extended position and the ballast tank descends.

12. The dynamic mass torque generator of claim 11, wherein when the ballast tank descends, a glide-track gear rotates via motion of a glide-track chain parallel to the glide-track, as the ballast tank support arms fold downward with the ballast tank.

13. A method of generating renewable energy, the method comprising:

generating torque using a lever-arm gear drive by transferring fluid between a ballast tank and a counter-weight ballast tank using a ballast pump;

transferring the generated torque to an angle bevel gear drive coupled to a torsion-spring axle and a crankshaft gear-drive intercept, using a torsion-spring shaft coupling;

transferring lateral rotation of the angle bevel gear-drive to the crankshaft gear-drive intercept using a torsion-spring axle;

diverting the torque to a clutch crankshaft gear for rotating a clutch crankshaft coupled to the clutch crankshaft gear;

converting the torque maintained by the crankshaft gear-drive intercept into potential energy and storing the potential energy inside a torsion spring using a flywheel clutch;

directing a torsion spring rotational clutch away from the torsion spring when the clutch crankshaft gear rotates, using a crankshaft connector to clutch release; and rotating a turbine generator by releasing the stored potential energy through a flywheel to produce electricity.

14. The method of generating renewable energy of claim 13, wherein the ballast tank begins a cycle when the ballast tank is full and an opposing counter-balance tank is empty and a hydraulic brake cylinder begins to retract from a full extended position and the ballast tank descends.

15. The method of generating renewable energy of claim 14, wherein when the ballast tank descends, a glide-track gear rotates via motion of a glide-track chain parallel to a glide-track, as the ballast tank support arms fold downward with the ballast tank.

\* \* \* \* \*